(12) United States Patent
Cottet

(10) Patent No.: US 11,279,471 B2
(45) Date of Patent: Mar. 22, 2022

(54) BIPEDAL NOSE LANDING GEAR FOR CARGO AIRCRAFT

(71) Applicant: The Boeing Company, Chicago, IL (US)

(72) Inventor: Justin Duane Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 16/405,781

(22) Filed: May 7, 2019

(65) Prior Publication Data

US 2020/0354041 A1    Nov. 12, 2020

(51) Int. Cl.
*B64C 25/12*    (2006.01)
*B64C 25/34*    (2006.01)

(52) U.S. Cl.
CPC .............. *B64C 25/12* (2013.01); *B64C 25/34* (2013.01); *B64C 2025/125* (2013.01)

(58) Field of Classification Search
CPC ......... B64C 25/18; B64C 25/10; B64C 25/60; B64C 25/62; B64C 25/58; B64C 25/26; B64C 25/28; B64C 25/14; B64C 25/20; B64C 25/22
See application file for complete search history.

(56) References Cited

U.S. PATENT DOCUMENTS

| | | | | |
|---|---|---|---|---|
| 2,659,555 A | * | 11/1953 | Schlender | B64C 25/34 244/102 R |
| 3,315,919 A | * | 4/1967 | Perdue | B64C 25/34 244/102 R |
| 3,335,981 A | * | 8/1967 | Pauli | B64C 1/22 244/102 R |
| 3,899,147 A | * | 8/1975 | Masclet | B64C 25/20 244/102 R |
| 5,000,400 A | * | 3/1991 | Stuhr | B64C 25/10 244/101 |
| 5,100,083 A | * | 3/1992 | Large | B64C 25/34 244/102 R |
| 5,478,030 A | * | 12/1995 | Derrien | B64C 25/12 244/102 R |
| 6,345,787 B1 | * | 2/2002 | Tighe | B64C 25/10 244/102 A |
| 2012/0111999 A1 | * | 5/2012 | Acks | B64C 25/34 244/102 A |
| 2012/0217341 A1 | * | 8/2012 | Bennett | B64C 25/20 244/102 A |

* cited by examiner

*Primary Examiner* — Joshua J Michener
*Assistant Examiner* — Colin Zohoori
(74) *Attorney, Agent, or Firm* — Duft & Bornsen, PC

(57) ABSTRACT

Systems and methods for bipedal nose landing gear of an aircraft. One embodiment is a nose landing gear of an aircraft. The nose landing gear includes a shock strut coupled to an axle with a nose wheel, and a folding side brace extending from the shock strut inboard toward a belly of the aircraft and configured to stabilize the shock strut. The nose landing gear also includes a trunnion configured to pivot the shock strut forward toward a nose and inboard toward the belly of the aircraft to retract the nose wheel.

20 Claims, 8 Drawing Sheets

BIPEDAL NOSE LANDING GEAR FOR CARGO AIRCRAFT

FIELD

This disclosure relates to the field of aircraft and, in particular, to landing gear for an aircraft.

BACKGROUND

Aircraft landing gears may retract during flight and extend for landing. A typical aircraft includes a wheel well that houses the landing gear during flight to reduce aerodynamic drag. However, some aircraft, such as cargo aircraft, may not include a wheel well in order to maximize interior space for cargo. Cargo aircraft also sometimes include high wings on an upper portion of the fuselage to maximize cargo space. With high wings, the landing gear is typically mounted to the fuselage. With the wings and wing-mounted engines higher off the ground, the center of gravity of the aircraft is higher as compared to a passenger aircraft. Furthermore, a cargo aircraft may have low ground clearance to facilitate loading and unloading cargo onto the cargo floor of the aircraft. Therefore, it would be desirable to have a landing gear arrangement for a cargo aircraft that takes into account these considerations.

SUMMARY

Embodiments described herein provide for bipedal nose landing gear for a cargo aircraft. The cargo aircraft includes a pair of nose landing gear at either side of the fuselage. The nose landing gears retract by swinging inward to have a low profile underneath the belly of the aircraft to reduce aerodynamic drag in the absence of a wheel well. The nose landing gears are widely set to increase ground stability of the aircraft. This, in turn, enables the main landing gears to be positioned farther inboard more directly underneath the load allowing the main landing gears to comprise a simplified structure and reduced weight.

One embodiment is a nose landing gear of an aircraft. The nose landing gear includes a shock strut coupled to an axle with a nose wheel, and a folding side brace extending from the shock strut inboard toward a belly of the aircraft and configured to stabilize the shock strut. The nose landing gear also includes a trunnion configured to pivot the shock strut forward toward a nose and inboard toward the belly of the aircraft to retract the nose wheel.

Another embodiment is a method of retracting a nose landing gear of an aircraft. The method includes mounting a trunnion longitudinally with a fuselage of the aircraft and outboard from a center line extending along a belly of the aircraft, and pivotally coupling a shock strut with the trunnion, the shock strut attached with an axle having a nose wheel. The method also includes attaching a folding side brace to the shock strut to project inboard from the shock strut toward the center line extending along the belly of the aircraft to stabilize the shock strut. The method further includes pivoting the shock strut via the trunnion forward toward a nose of the aircraft and inboard toward the center line extending along the belly of the aircraft to retract the nose wheel.

Another embodiment is an aircraft that includes a pair of nose landing gears. Each nose landing gear includes a shock strut coupled to an axle with a nose wheel, a folding side brace extending from the shock strut inboard toward a belly of the aircraft and configured to stabilize the shock strut, and a trunnion configured to pivot the shock strut forward toward a nose and inboard toward the belly of the aircraft to retract the nose wheel.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
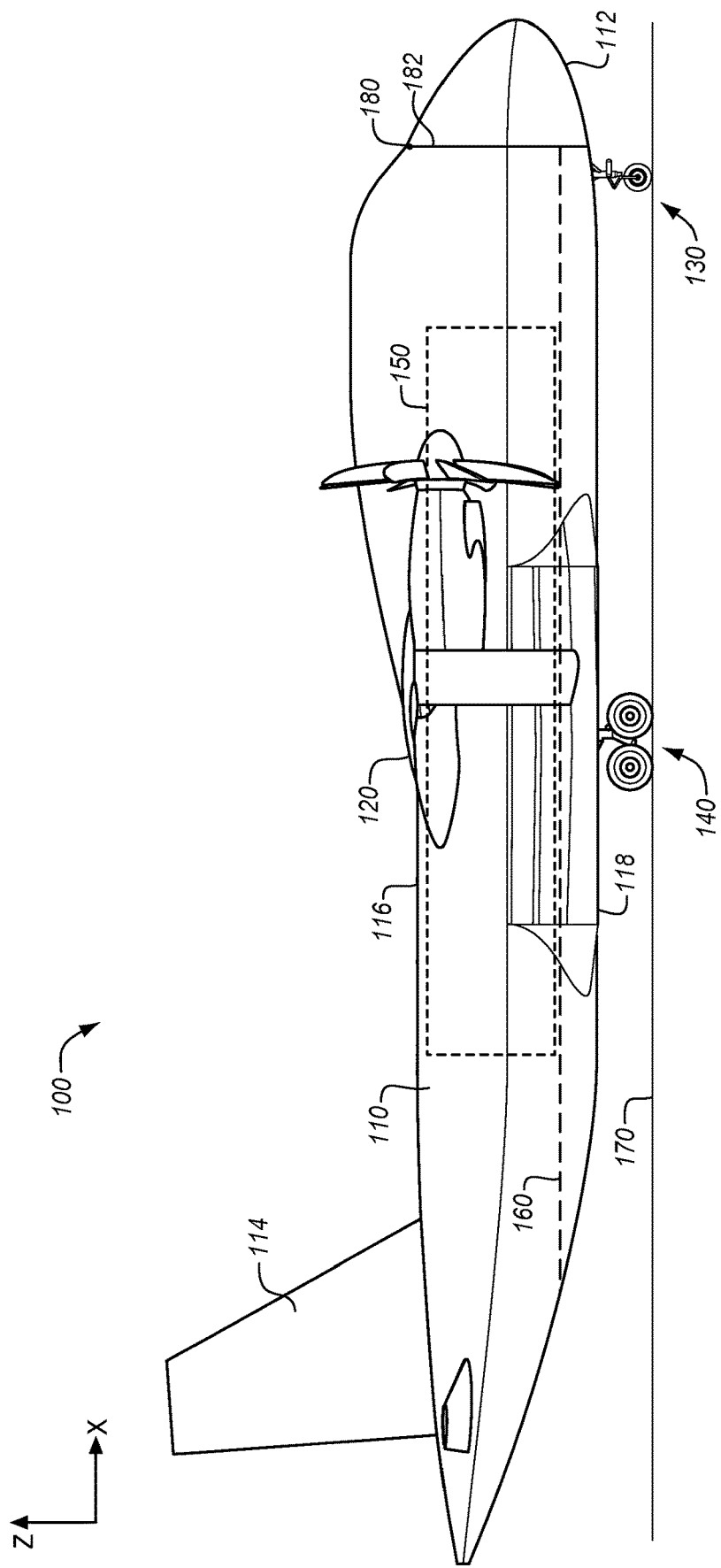
FIG. 1 is a side view of an aircraft in an illustrative embodiment.

FIG. 1 is a side view of an aircraft 100 in an illustrative embodiment. The aircraft 100 includes a fuselage 110 including a nose 112 and tail 114. The aircraft 100 also includes wings 120, nose landing gear 130, and main landing gear 140. As described in greater detail below, the aircraft 100 is enhanced with a configuration of the nose landing gear 130 that provides increased interior space of the fuselage 110, increased ground stability, reduced aerodynamic drag, and allows the nose landing gear 130 to extend without hydraulics using gravity and aerodynamic drag.

Features of the nose landing gear 130 may be applicable in embodiments in which the aircraft 100 is a cargo aircraft. For example, as shown in FIG. 1, the aircraft 100 may include a high-wing configuration in which the wings 120 attach at or near a top 116 of the fuselage 110 to maximize interior space of the fuselage 110 for cargo 150, such as a shipping container. The aircraft 100 may also exclude a wheel well to maximize interior space of the fuselage 110. Additionally, the aircraft 100 may include a cargo floor 160 extending longitudinally along the fuselage 110 to support the cargo 150. The aircraft 100 may have a low-deck configuration in which a height from the ground 170 to a belly 118 of the fuselage 110 or the cargo floor 160 is low for easier loading and unloading of the cargo 150. The cargo floor 160, in some embodiments, comprises a level deck that increases the height of the nose landing gear 130 compared with passenger aircraft.

Still further, in some embodiments, the nose 112 may include a hinge 180 configured to pivot from a nose frame 182 of the fuselage 110 for loading and unloading the cargo 150 onto the cargo floor 160 through the nose frame 182. Alternatively or additionally, the cargo 150 may be loaded and unloaded proximate to the tail 114. It will be appreciated, however, that the features and functions of the nose landing gear 130 and the main landing gear 140 described in greater detail below may apply to alternative aircraft having some combination of cargo carrying features described above or no such features.

Figure 2:
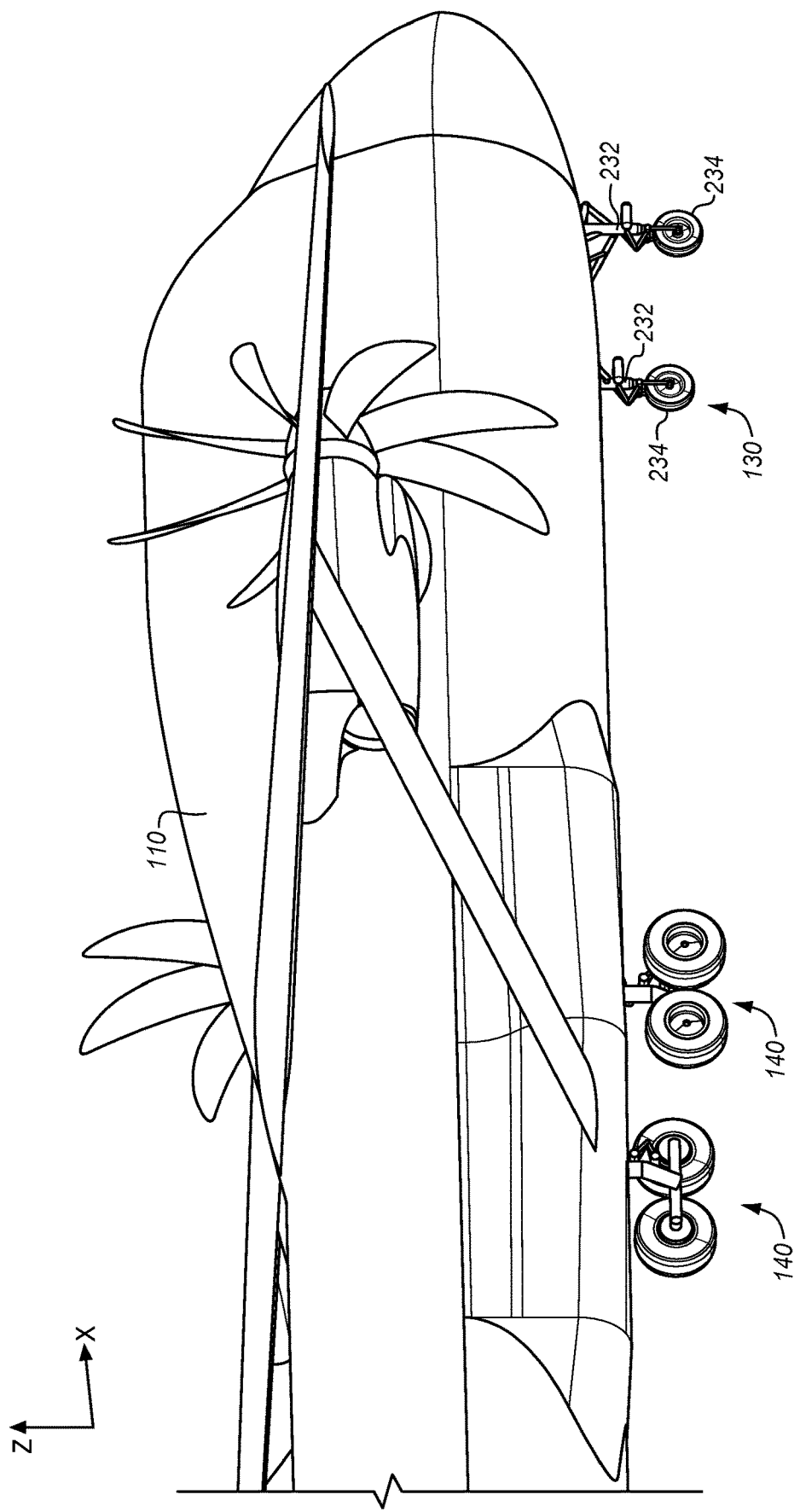
FIG. 2 is a perspective side view of the aircraft in an illustrative embodiment.

FIG. 2 is a perspective side view of the aircraft 100 in an illustrative embodiment. As shown in FIG. 2, the aircraft 100 includes a pair of nose landing gears 130 and a pair of main landing gears 140. Generally, the nose landing gears 130 support the fuselage 110 at a position toward the nose 112, and the main landing gears 140 support the fuselage 110 at a position aft of the nose landing gears 130, toward a middle section between the nose 112 and the tail 114. The pair of nose landing gears 130 comprise a pair of shock struts 232 disposed across the fuselage 110, and at least one nose wheel 234 rotatably attached to each shock strut 232. In other words, the nose landing gears 130 straddle a center line extending longitudinally along the belly 118 of the fuselage 110. Features of the nose landing gears 130 are described in greater detail below.

Figure 3:
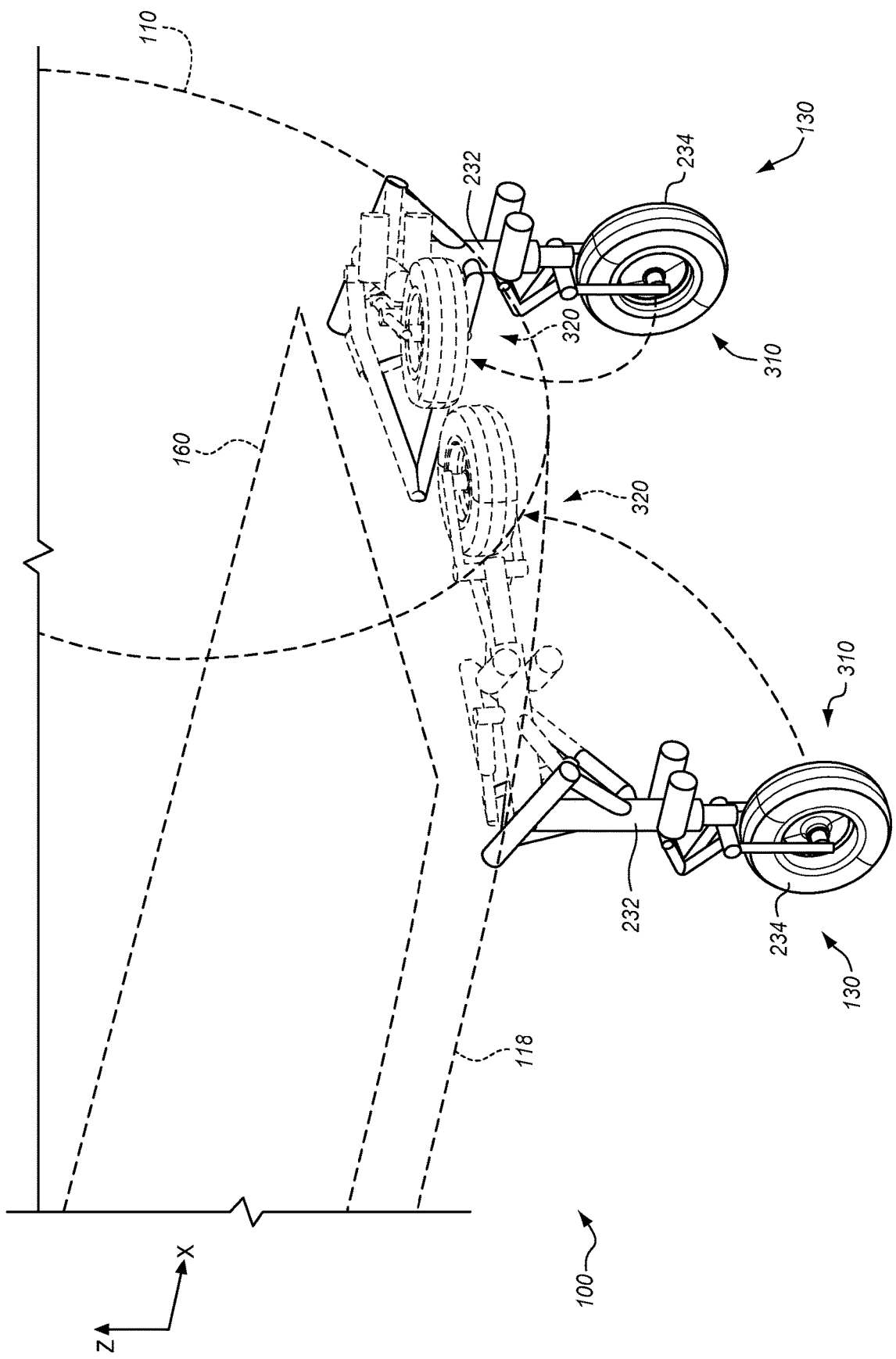
FIG. 3 is a perspective side view of a pair of nose landing gears of the aircraft in an illustrative embodiment.

FIG. 3 is a perspective side view of the pair of nose landing gears 130 of the aircraft 100 in an illustrative embodiment. Each nose landing gear 130 is configured to pivot inboard to retract, as indicated by the dashed arrow lines in FIG. 3. In particular, from an extended position 310 where the nose landing gear 130 supports the aircraft 100 on the ground 170, the nose landing gear 130 pivots inboard to a retracted position 320 where the nose wheel 234 is tucked against and/or into the belly 118 of the fuselage 110. Portions of the shock strut 232 and/or nose wheel 234 protruding underneath the belly 118 is minimal in the retracted position 320 to reduce or minimize aerodynamic drag.

Figure 4:
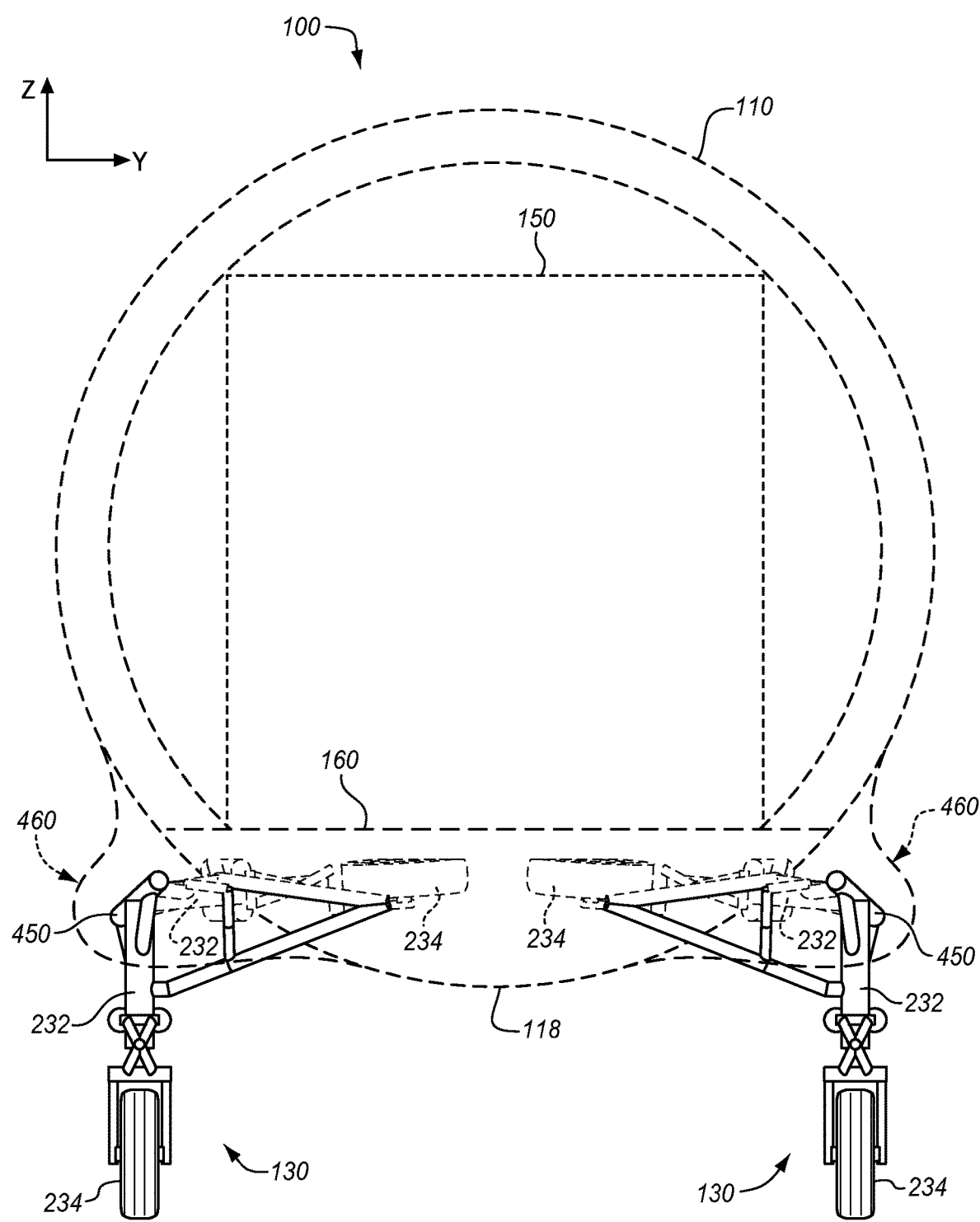
FIG. 4 is a rear view of the pair of nose landing gears of the aircraft in an illustrative embodiment.

FIG. 4 is a rear view of the pair of nose landing gears 130 of the aircraft 100 in an illustrative embodiment. As shown in FIG. 4, each shock strut 232 is configured to pivot to retract the nose wheel 234 toward a center of the fuselage 110 underneath the cargo floor 160. In one embodiment, the shock struts 232 are pivotally attached to the aircraft 100 via trunnions 450 disposed outboard from the cargo floor 160. That is, a distance between the trunnions 450 (e.g., in the y-direction) may be larger than a width of the cargo floor 160. The bi-pedal, wide stance configuration of the nose landing gears 130 advantageously increases ground stability of the aircraft 100 to reduce tipping risk. The increased stability helps offset a higher center of gravity the aircraft 100 may have by incorporating a high-wing configuration that carries bulky cargo, such as shipping containers. Additionally, by improving the stability of the aircraft 100 with the pair of nose landing gears 130, the pair of main landing gears 140 (not shown in FIG. 4) may be set closer together to simplify the structure of the main landing gears 140.

The nose landing gears 130 may attach to the aircraft 100 external to the fuselage 110 to facilitate its wide stance and increased ground stability. The trunnions 450 may therefore be disposed outside the fuselage 110, as shown in FIG. 4. Accordingly, in some embodiments, the aircraft 100 includes a pair of nose fairings 460 mounted to the fuselage 110, and the trunnions 450 are each disposed outside of the fuselage 110 and inside one of the pair of nose fairings 460. The nose fairings 460 may comprise a low profile that covers the trunnions 450 to reduce aerodynamic drag.

Figure 5:
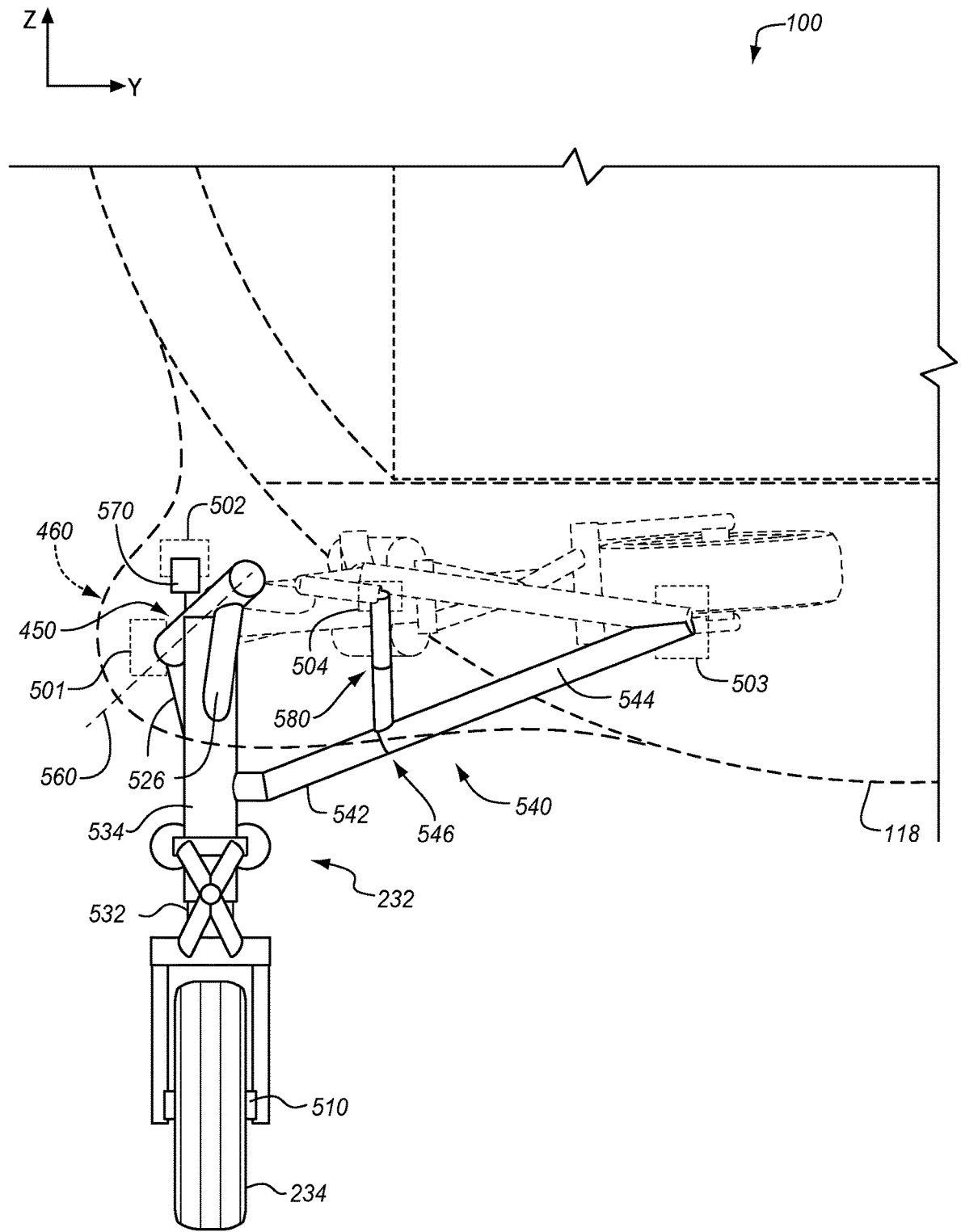
FIG. 5 is a closeup rear view of the nose landing gear of the aircraft in an illustrative embodiment.

FIG. 5 is a closeup rear view of the nose landing gear 130 of the aircraft 100 in an illustrative embodiment. As shown in FIG. 5, the nose landing gear 130 includes an axle 510 coupled with the nose wheel 234, and the shock strut 232 coupled to the axle 510. The shock strut 232 includes a bottom cylinder 532 coupled with an axle 510, and a top cylinder 534 that is telescopic with the bottom cylinder 532. The bottom cylinder 532 and the top cylinder 534 may also be referred to as inner cylinder and outer cylinder, respectively. Generally, the bottom cylinder 532 slides in the top cylinder 534, and the shock strut 232 uses hydraulic fluid to absorb and dissipate shock loads on landing.

The nose landing gear 130 further includes the trunnion 450 configured to pivotally couple the shock strut 232 with the aircraft 100. The trunnion 450 may comprise a joint structure, such as a shaft rotatably about bearings, to pivotally join the shock strut 232 with aircraft structure 501. The top cylinder 534 of the shock strut 232 may include support arms 526 to support the trunnion 450 longitudinally or substantially longitudinally with the fuselage 110 for inboard retraction of the nose wheel 234. For example, the support arms 526 may extend from the top cylinder 534 in a direction up toward the belly 118 to orient a hinge axis 560 of the trunnion 450 to extend lengthwise substantially along a fore and aft direction of the aircraft 100. The support arms 526 may be v-shaped with the trunnion 450 extending between top ends of the support arms 526.

The nose landing gear 130 also includes a folding side brace 540 extending from the shock strut 232 inboard toward the belly 118 of the aircraft 100. The folding side brace 540 is configured to stabilize the shock strut 232 for landing and ground operation. The folding side brace 540 may include a first member 542 and a second member 544 connected via a hinge 546. The first member 542 may attach with the top cylinder 534 of the shock strut 232, and the second member 544 may attach with aircraft structure 503. The aircraft structure 503 may be located inboard and low on a frame structure of the aircraft 100 (e.g., a height below the trunnion 450), allowing for an efficient load path. With the nose landing gear 130 in the extended position 310, the folding side brace 540 is configured to straighten with the first member 542 and the second member 544 extending in a straight line between the shock strut 232 and aircraft structure 503. The straightened position of the folding side brace 540 locks the first member 542 and the second member 544 together so that the nose landing gear 130 is rigidly supported on the ground. The hinge 546 allows the folding side brace 540 to fold for retracting the nose landing gear 130. In the extended position 310, the folding side brace 540 may extend from the shock strut 232 inboard and up toward the belly 118 of the aircraft 100.

The nose landing gear 130 may additionally include lock links 580 coupled with the folding side brace 540 and configured to stabilize the folding side brace 540 when the nose landing gear 130 is in the extended position 310. The lock links 580 may comprise a hinged structure configured to straighten over center or along a middle portion to stabilize the folding side brace 540 while the aircraft 100 is on the ground. Additionally, the lock links 580 are configured to hinge over center or along a middle portion to allow the folding side brace 540 to fold such that the nose landing gear 130 may retract in an unimpeded inboard/forward motion.

The nose landing gear 130 also includes a retraction actuator 570 configured to pivot the shock strut 232 about the trunnion 450 to retract the nose wheel 234. The nose landing gear 130 is attached with the aircraft 100 at aircraft structure 501-504 representing fixed structural attachment points to the aircraft 100 and indicated by the dashed squares in FIG. 5. In particular, the trunnion 450 may be attached with aircraft structure 501 with the hinge axis 560 arranged longitudinally with the aircraft 100 to pivot the shock strut 232 inboard toward the belly 118 of the aircraft 100 to retract the nose wheel 234. The retraction actuator 570 may attach with aircraft structure 502 to pivotally couple the shock strut 232 with the aircraft 100. For example, the retraction actuator 570 may couple with a retraction horn projecting from the trunnion 450 and be configured to pull the retraction horn up (e.g., toward the belly 118) to apply torque to the trunnion 450 and swing the shock strut 232, axle 510, and nose wheel 234 about the hinge axis 560 of the trunnion 450. The folding side brace 540 and the lock links 580 may attach with aircraft structures 503-504, respectively, to stabilize the nose landing gear 130 in the extended position 310. The configuration of the nose landing gear 130 advantageously enables the structure to tuck closely with the belly 118 of the fuselage 110 and to reside outside the cargo volume of the aircraft 100 in the retracted position 320.

Figure 6:
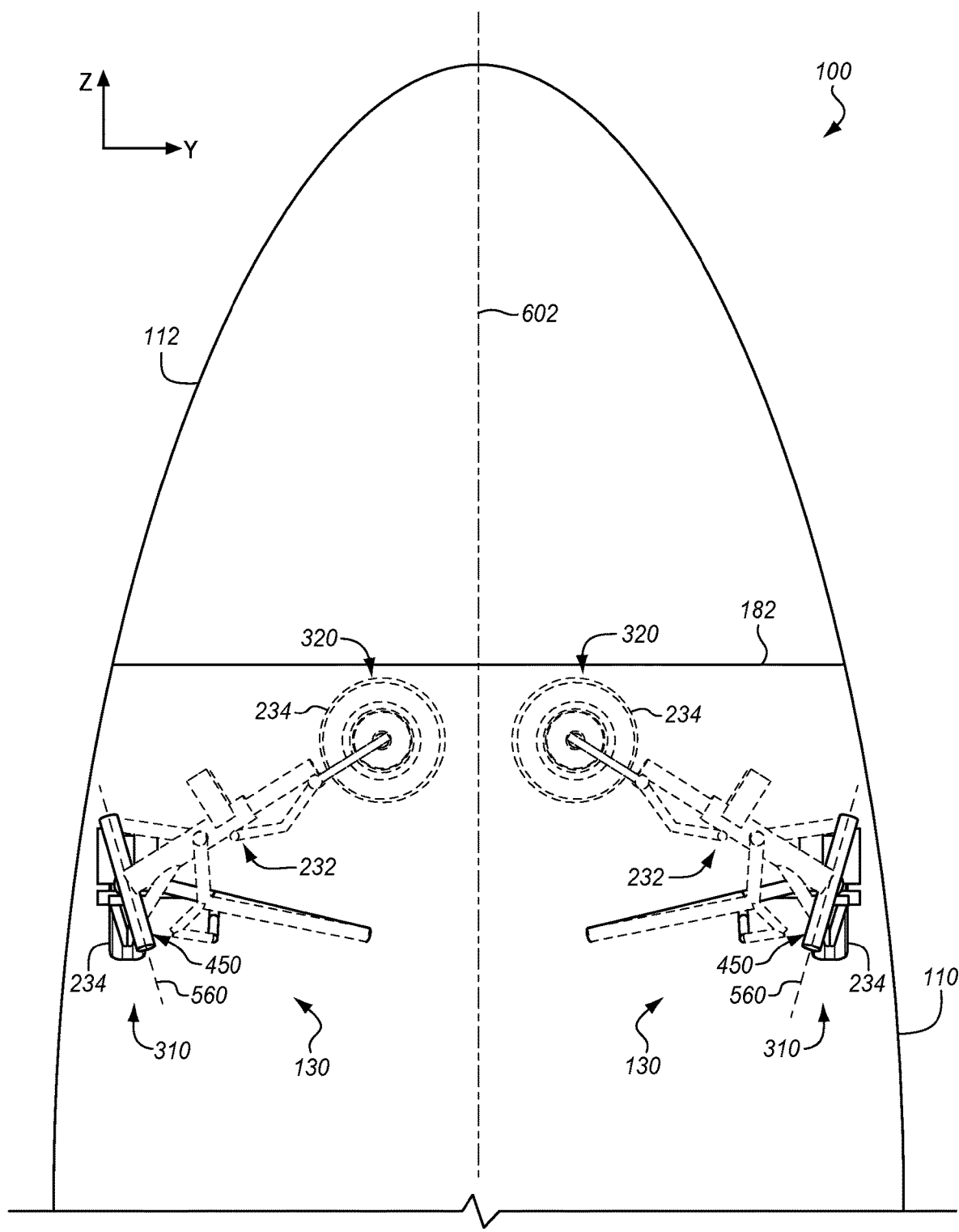
FIG. 6 is a top view of the pair of nose landing gears of the aircraft in an illustrative embodiment.

FIG. 6 is a top view of the pair of nose landing gears 130 of the aircraft 100 in an illustrative embodiment. As shown in FIG. 6, each shock strut 232 is configured to pivot inboard (e.g., via hydraulics) to retract the nose wheel 234 toward a center line 602 extending longitudinally along the belly 118 of the fuselage 110, and the retraction of the shock struts 232 may be symmetric about the center line 602. In addition to retracting inboard, the shock struts 232 may pivot forward (e.g., toward the nose 112) to retract. That is, each shock strut 232 is configured to pivot about the trunnion 450 forward toward the nose 112 and inboard toward the belly 118 of the aircraft 100 to retract the nose wheels 234 to the retracted position 320. Therefore, each nose landing gear 130 is configured to extend the shock strut 232 to the extended position 310 via gravity and aerodynamic drag. For example, in the event of a hydraulic or power failure of the aircraft 100, each nose landing gear 130 is able to reach the extended position 310 for landing by being lowered from gravitational pull on its weight and being pushed backward by air as the aircraft 100 travels forward.

As shown in FIG. 6, the trunnions 450 may be oriented with the hinge axes 560 primarily extending in a forward/aft direction for inboard retraction motion and with an offset angle from the forward/aft direction for at least some forward retraction motion of the shock strut 232 and nose wheel 234. In some embodiments, the retraction of the nose landing gears 130 is substantially in the inboard direction with the forward direction retraction minimized yet still retracted forward enough to enable alt extend (e.g., reach the extended position 310 without aircraft hydraulic systems). The minimized forward direction retraction may reduce the forward projection of the shock struts 232 and nose wheels 234 in the retracted position 320, and allow the trunnions 450 to be mounted in line with sides of the fuselage 110 to directly support the shock struts 232 underneath the load of the aircraft 100 at lateral sides of the fuselage 110 (e.g., along or proximate with a vertical tangent line to sides of the fuselage 110).

Still further, for embodiments in which the nose 112 is hinged for loading and unloading cargo through the nose frame 182, the trunnions 450 may mount to the aircraft 100 at positions in which the retracted position 320 of the shock struts 232 and nose wheels 234 avoid interfering with the hinged structure of the nose 112. In one embodiment, each trunnion 450 is mounted aft of the nose frame 182 and configured to pivot the shock strut 232 inboard/forward to retract the nose wheel 234 aft of the nose frame 182. Thus, in the retracted position 320, the nose wheels 234 are positioned aft of the nose frame 182. As additionally shown in FIG. 6, the folding side brace 540 may extend from the shock strut 232 inboard toward the belly 118 of the aircraft 100 and aft toward a tail 114 of the aircraft 100 to allow the shock strut 232 to retract forward from the folding side brace 540 and closely tuck underneath the belly 118.

Figure 7:
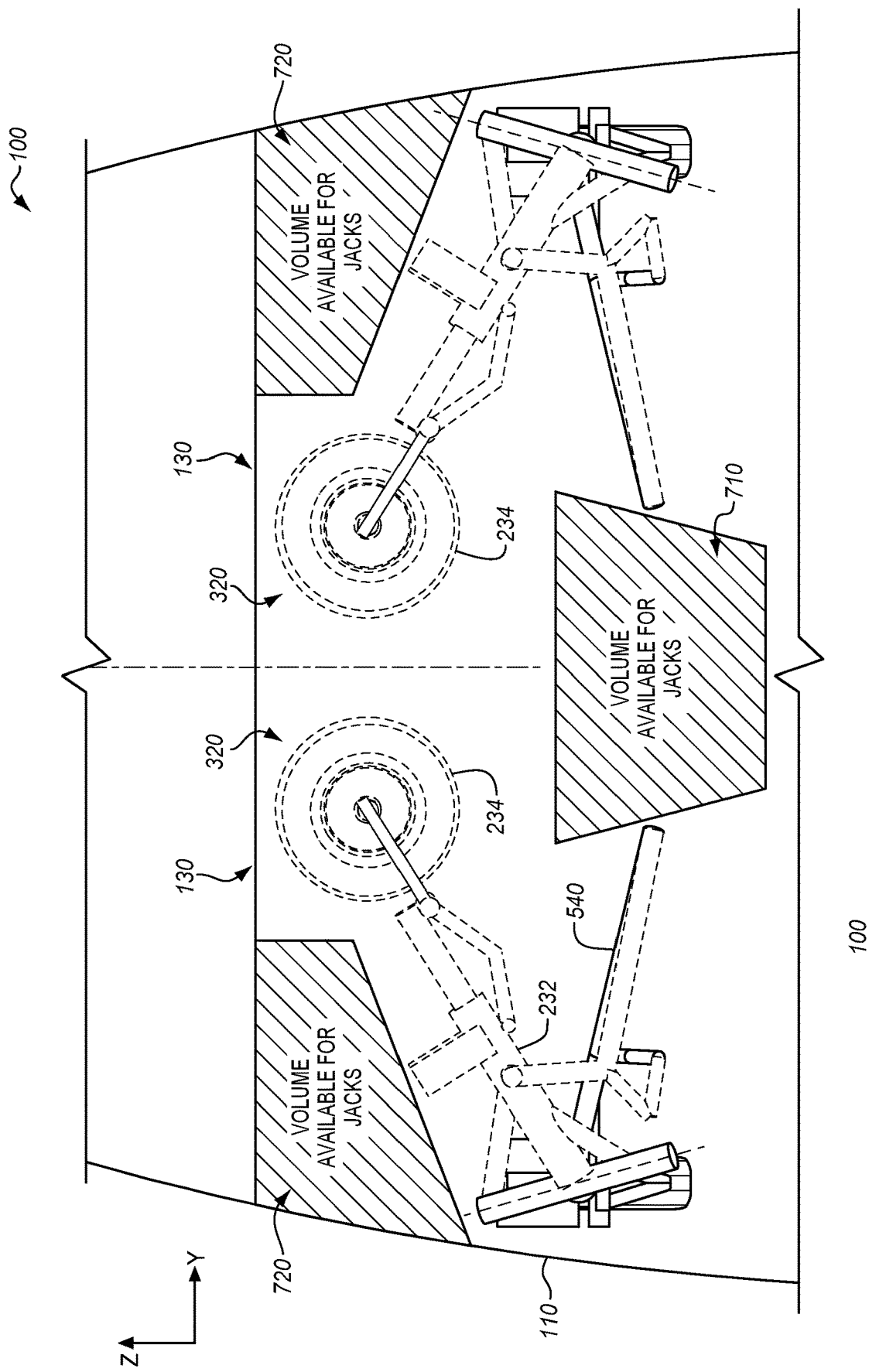
FIG. 7 is a top view of the pair of nose landing gears of the aircraft in another illustrative embodiment.

FIG. 7 is a top view of the pair of nose landing gears 130 of the aircraft 100 in another illustrative embodiment. With the pair of nose landing gears 130 in a retracted position 320, a space 710 between the pair of nose landing gears 130 including an area aft of the nose wheels 234 and forward from the folding side braces 540 is available for installing aircraft systems, such as a steering system reservoirs, hydraulic pumps, etc. of the aircraft 100. Additionally, with the pair of nose landing gears 130 in a retracted position 320, a space 720 outboard from the nose wheels 234 and forward from the shock struts 232 is available for positioning loading jacks underneath the aircraft 100.

Figure 8:
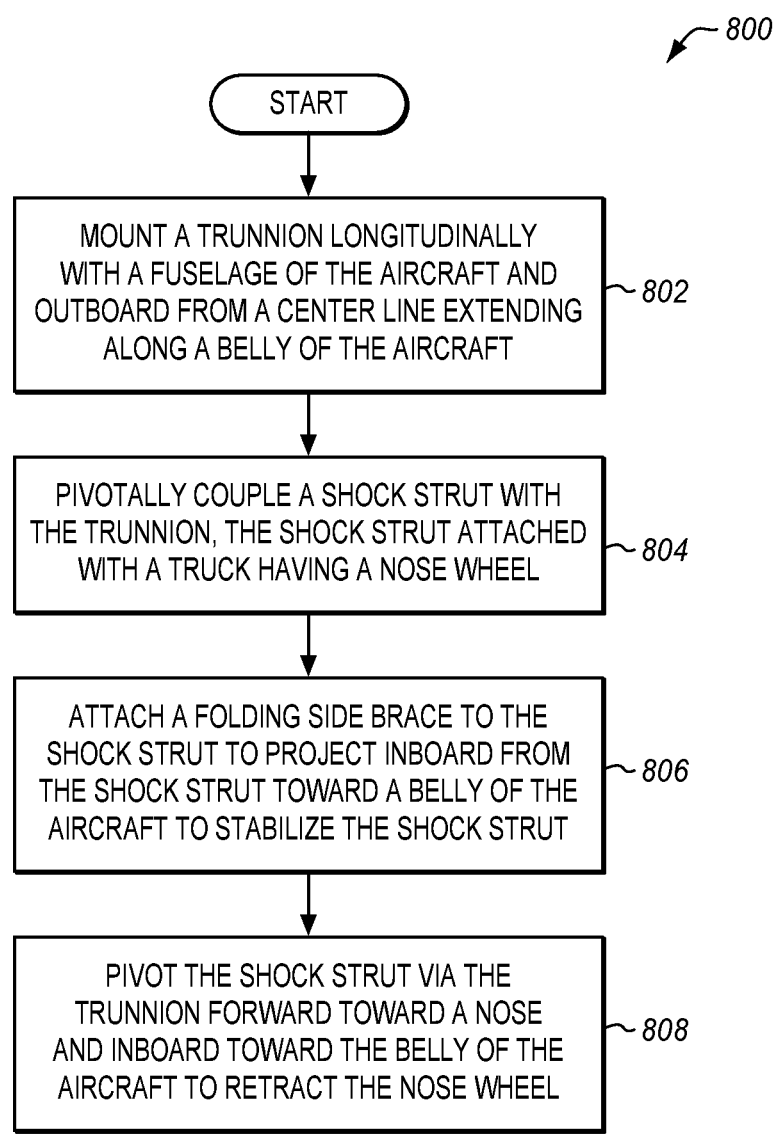
FIG. 8 is a flowchart illustrating a method for retracting the nose landing gear in an illustrative embodiment.

FIG. 8 is a flowchart illustrating a method 800 for retracting the nose landing gear 130 in an illustrative embodiment. The steps of the method 800 are described with reference to the nose landing gear 130 and the aircraft 100 of FIGS. 1-7, but those skilled in the art will appreciate that method 800 may be performed with alternative nose landing gear structures and aircraft. The steps of the flowcharts described herein are not all inclusive and may include other steps not shown. The steps described herein may also be performed in an alternative order.

In step 802, the trunnion 450 is mounted longitudinally with the fuselage 110 of the aircraft 100 and outboard from a center line 602 extending along the belly 118 of the aircraft 100. In one embodiment, the trunnion 450 is mounted outboard from the cargo floor 160 of the aircraft 100. Alternatively, the trunnion 450 may be mounted at an outboard end of the cargo floor 160 underneath the cargo floor 160. Alternatively or additionally, the trunnion 450 may be mounted outside the fuselage 110 and inside the nose fairing 460.

In step 804, the shock strut 232 is pivotally coupled with the trunnion 450. In step 806, the folding side brace 540 is attached to the shock strut 232 to project inboard from the shock strut 232 toward the center line 602 extending along the belly 118 to stabilize the shock strut 232. In step 808, the shock strut 232 pivots via the trunnion 450 forward toward the nose 112 and inboard toward the center line 602 extending along the belly 118 of the aircraft 100 to retract the nose wheel 234.

Although specific embodiments were described herein, the scope is not limited to those specific embodiments. Rather, the scope is defined by the following claims and any equivalents thereof

What is claimed is:

1. A nose landing gear of a cargo aircraft comprising:
   a shock strut coupled to an axle with a nose wheel;
   a folding side brace extending from the shock strut
      inboard toward a belly of the cargo aircraft and configured to stabilize the shock strut, having a first member attached to a top cylinder of the shock strut and a second member that is attached with aircraft structure at the cargo aircraft and coupled with the first member via a hinge, the folding side brace configured to fold during retraction of the nose landing gear, and straighten during extension of the nose landing gear, wherein in a retracted position, a space between the nose landing gear and another nose landing gear including an area aft of the nose wheel and forward from the folding side braces is available for installing a hydraulic pump; and a trunnion disposed outboard from a cargo floor and configured to pivot the shock strut forward toward a nose and inboard toward the belly of the cargo aircraft to retract the nose wheel so that a sidewall of the nose wheel faces the cargo floor.

2. The nose landing gear of claim 1 wherein:
the trunnion includes a hinge axis arranged longitudinally with the cargo aircraft and configured to pivot the shock strut forward toward the nose and inboard toward the belly of the cargo aircraft to retract the nose wheel, and
the forward pivot of the shock strut to retract the nose wheel enables the shock strut to extend via gravity and aerodynamic drag.

3. The nose landing gear of claim 1 further comprising:
a retraction actuator coupled to the trunnion and configured to pivot the shock strut about the trunnion to retract the nose wheel.

4. The nose landing gear of claim 1 wherein:
the folding side brace extends from the shock strut inboard toward the belly of the cargo aircraft and aft toward a tail of the cargo aircraft.

5. The nose landing gear of claim 1 wherein:
the trunnion is mounted outside a fuselage of the cargo aircraft and inside a nose fairing.

6. The nose landing gear of claim 1 wherein:
the shock strut includes a bottom cylinder coupled with the axle, and a top cylinder that is telescopic with the bottom cylinder.

7. The nose landing gear of claim 1 further comprising:
lock links coupled with the folding side brace and configured to stabilize the folding side brace when the nose landing gear is in an extended position.

8. A method of retracting a nose landing gear of a cargo aircraft, the method comprising:
mounting a trunnion longitudinally with a fuselage of the cargo aircraft and outboard from a center line extending along a belly of the cargo aircraft, the trunnion disposed outboard from a cargo floor of the cargo aircraft;
pivotally coupling a shock strut with the trunnion, the shock strut attached with an axle having a nose wheel;
attaching a folding side brace to the shock strut to project inboard from the shock strut toward the center line extending along the belly of the cargo aircraft to stabilize the shock strut, the folding side brace having a first member attached to a top cylinder of the shock strut and a second member that is attached with aircraft structure at the cargo aircraft and coupled with the first member via a hinge, the folding side brace configured to fold during retraction of the nose landing gear, and straighten during extension of the nose landing gear, wherein in a retracted position, a space between the nose landing gear and another nose landing gear including an area aft of the nose wheel and forward from the folding side braces is available for installing a hydraulic pump; and pivoting the shock strut via the trunnion forward toward a nose of the cargo aircraft and inboard toward the center line extending along the belly of the cargo aircraft to retract the nose wheel so that a sidewall of the nose wheel faces the cargo floor.

9. The method of claim 8 wherein:
the trunnion includes a hinge axis arranged longitudinally with the cargo aircraft to pivot the shock strut forward toward the nose and inboard toward the belly of the cargo aircraft to retract the nose wheel.

10. The method of claim 8 wherein:
the folding side brace extends from the shock strut inboard toward the belly of the cargo aircraft and aft toward a tail of the cargo aircraft.

11. The method of claim 8 further comprising:
pivoting the shock strut with a retraction actuator to retract the nose wheel.

12. The method of claim 8 further comprising:
folding the folding side brace via the hinge.

13. The method of claim 8 further comprising:
mounting the trunnion outside the fuselage of the cargo aircraft and inside a nose fairing.

14. A cargo aircraft comprising:
a pair of nose landing gears each comprising:
a shock strut coupled to an axle with a nose wheel;
a folding side brace extending from the shock strut inboard toward a belly of the cargo aircraft and configured to stabilize the shock strut, having a first member attached to a top cylinder of the shock strut and a second member that is attached with aircraft structure at the cargo aircraft and coupled with the first member via a hinge, the folding side brace configured to fold during retraction of one of the nose landing gears, and straighten during extension of the one of the nose landing gears; and
a trunnion disposed outboard from a cargo floor and configured to pivot the shock strut forward toward a nose and inboard toward the belly of the cargo aircraft to retract the nose wheel so that a sidewall of the nose wheel faces the cargo floor,
wherein with the pair of nose landing gears in a retracted position, a space between the pair of nose landing gears including an area aft of the nose wheels and forward from the folding side braces is available for installing a hydraulic pump.

15. The cargo aircraft of claim 14 wherein:
the pair of nose landing gears are attached at different sides of a fuselage and configured to pivot the shock struts forward and inboard symmetrically about a center line extending longitudinally along the belly of the cargo aircraft.

16. The cargo aircraft of claim 14 wherein:
with the pair of nose landing gears in a retracted position, a space between the pair of nose landing gears including an area aft of the nose wheels and forward from the folding side braces is available for installing a steering system reservoir of the cargo aircraft.

17. The cargo aircraft of claim 14 wherein:
with the pair of nose landing gears in a retracted position, a space outboard from the nose wheels and forward from the shock struts is available for positioning loading jacks underneath the cargo aircraft.

18. The cargo aircraft of claim 14 wherein:
the nose includes a hinge configured to pivot from a nose frame of a fuselage for loading cargo onto the cargo floor through the nose frame, and for each of the pair of nose landing gears, the trunnion is mounted aft of the nose frame and configured to pivot the shock strut inboard to retract the nose wheel aft of the nose frame.

19. The cargo aircraft of claim 18 further comprising:

a pair of nose fairings to cover the trunnion on each side of the fuselage.

20. The cargo aircraft of claim 14 wherein:

the folding side brace is configured to fold at the hinge.

\* \* \* \* \*